US005884360A

United States Patent [19]

Palffy

[11] Patent Number: 5,884,360

[45] Date of Patent: Mar. 23, 1999

[54] NOZZLE ARRANGEMENT AND USE THEREOF

[75] Inventor: Sandor Palffy, Ennetbaden, Switzerland

[73] Assignee: Festo KG, Esslingen, Germany

[21] Appl. No.: 765,210

[22] PCT Filed: Jul. 4, 1995

[86] PCT No.: PCT/CH95/00152

§ 371 Date: Jan. 6, 1996

§ 102(e) Date: Jan. 6, 1996

[87] PCT Pub. No.: WO96/01343

PCT Pub. Date: Jan. 18, 1996

[30] Foreign Application Priority Data

Jul. 5, 1994 [CH] Switzerland .......................... 2164/94

[51] Int. Cl.[6] .......................... B65G 53/10

[52] U.S. Cl. .......................... 15/346; 15/409

[58] Field of Search .......................... 15/345, 346, 409

[56] References Cited

U.S. PATENT DOCUMENTS

| | | | |
|---|---|---|---|
| 2,916,761 | 12/1959 | Oberg | 15/346 X |
| 3,078,496 | 2/1963 | Doran et al. | 15/346 |
| 3,469,275 | 9/1969 | Deschuttere et al. | 15/346 X |
| 4,018,483 | 4/1977 | Smith | 15/409 X |
| 4,594,748 | 6/1986 | Warfvinge | 15/345 X |
| 4,707,879 | 11/1987 | Moszkowski | 15/345 |
| 5,280,667 | 1/1994 | Coathupe | 15/345 X |
| 5,490,300 | 2/1996 | Horn | 15/345 X |
| 5,577,294 | 11/1996 | Pollock | 15/345 |

*Primary Examiner*—Chris K. Moore
*Attorney, Agent, or Firm*—Schweitzer Cornman Gross & Bondell LLP

[57] ABSTRACT

With one or several pressure streams projected at an acute angle (α) in relation to the surface to be processed, shearing forces can be reached that are high enough to move solid particles and/or fluid media and thus make it easier to suck them away. The recognition of this fact is used in a delivery/suction nozzle arrangement together with the per se known Coanda effect. The invention may be used with all fluid media, preferably for cleaning practicable and passage surfaces; also for drying and/or degassing surfaces, as well as for industrial processes, in particular substance separation processes.

11 Claims, 6 Drawing Sheets

NOZZLE ARRANGEMENT AND USE THEREOF

The present invention relates to a nozzle arrangement for the positive intake and removal of solid particles and/or flow media, with separately disposed nozzle components being connected by pressure or suction lines.

It further relates to preferred uses of this nozzle arrangement.

Known nozzles for the intake and removal of particles such as sand, dust, packing and insulating materials or of flow media (flowable media) such as gases, real liquids or pulverulent substances are as a rule connected to compressors which accelerate a transport medium. Suitable suction processes demand high suction power in order to produce the required dragging forces, mostly produce a large amount of noise and, in addition, move the transported matter to its destination with a considerable excess of energy.

As a result, dust particles for instance, are passed through filters, so that in practice the cleaning process often results in a physical separation of larger and smaller particles only; the dust, penetrating the filter, is merely relocated.

It is thus an object of the invention to provide a device which is free of the disadvantages of the state of the art.

The compressor power required should be lower as compared to the known suction arrangements, while still being used optimally. The transport flow media should be easily adaptable, during use, to the task at hand, i.e, to the particles to be transported and/or to similar or different flow media, also under changing conditions of operation.

According to the invention, there is provided a positive guiding of the transport medium, while utilizing the Coanda effect known from fluid mechanics.

A substantial advantage of this solution resides in the fact that the shearing forces created by the guided pressure flow detaches from their substrate the particles to be taken in and/or the additional flow media and sets them in motion, so that they can then be more easily transported, with less energy and at lower speeds.

Advantageously, the suction flow used for the above is quantitatively larger than the pressure flow.

Separating means are used to segregate the particles from the flow media, and may include fillers, separators and catalysts. They can be complemented or replaced by other, per se known process-engineering means and chemical/physical methods such as ion exchanges, cold traps, etc.

A nose-like body may form a disruption element for positive vortex formation and jet guidance, and is advantageously provided in addition to a disruption edge. An elastically or hingedly arranged pulsator may be mounted in the region of the nozzle mouth. This pulsator produces the impulse-like turbulences serving for the detachment of the Coanda flow in the working region. This positively produces non-stationary processes which replace a corresponding costly control of the pressure flow.

Both pressure and suction flow may be controlled by width-adjusting means to facilitate the adaptation of the flows to working conditions and to the media to be transported. Also, using suitable control members, flow conditions can be adjusted during operation.

Bores or slots may be provided in association with a nozzle arrangement to boost the flow in the working region. A powered or self-rotating brush may be provided which either directly touches the surface being worked, or is positioned above this surface and merely acts on the flows in the transverse direction, thereby assisting in the drawing-in of the media to be transported.

Differing flow velocities can be developed in one and the same pressure-nozzle component which has a particularly positive effect on the delivery performance of the arrangement with light particles.

The connection of the pressure and suction lines to a common drive unit is particularly energy-saving and, apart from the economic aspect, also positively affects noise emission.

The inclusion of lateral openings in the suction nozzle part generate a helical flow enhancing the removal of flow media and of possible particles.

A preferred use of the object according to the invention is seen to be in cleaning machines for pedestrian and vehicular surfaces. Use of the object of the invention in sand-collecting basins and for the cleaning of swimming pools proved to be particularly efficient. The invention may also be used for drying and degassing, which is of importance in general process engineering and also in underground and surface engineering (road building). Equally advantageous for process engineering is the use of the present invention for separation processes in the recycling of materials of differing density and flow resistances.

Figure 1:
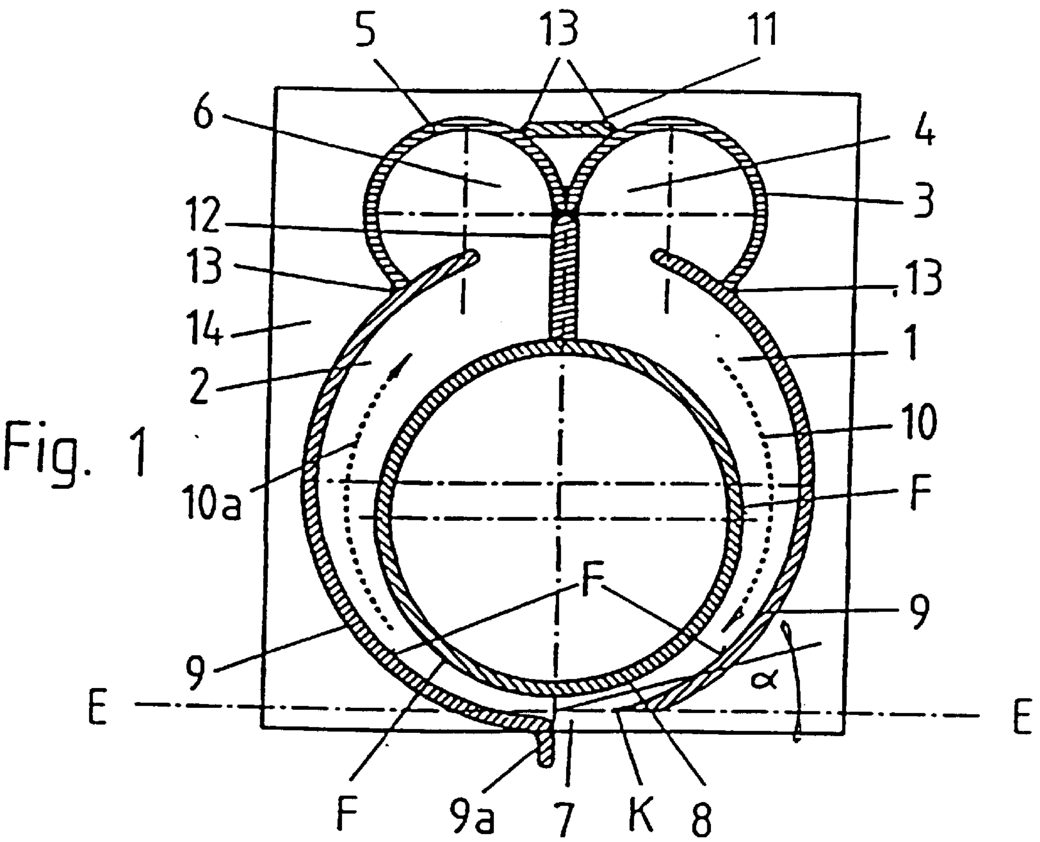
FIG. 1 is a cross-sectional view along plane A—A of a first variant the nozzle arrangement of FIG. 2.

In FIG. 1 a pressure-nozzle component is given the reference numeral 1, a suction-nozzle component, the reference numeral 2. The pressure-nozzle component is connected to the pressure line 3, with the elongated connecting opening 4 between the line 3 and the pressure-nozzle component 1 serving as passageway. The suction-nozzle component 2 is connected to the line 5 for drawn-in flow media, possibly carrying drawn-in solid particles, via an elongated connecting opening between the line 5 and the suction-nozzle component 2. Between the ends of the nozzle components 1 and 2 there is located a nozzle mouth 7. Both nozzle components 1 and 2 are led along an inner tube 8. From the outside, the nozzle components are constituted by outer guide walls 9.

The left outer wall is bent towards the outer side, that is, downwards, thus forming an edge 9a. The reference numeral 10 signifies a pressure flow, the reference numeral 10*a*, a suction flow. A brace 11 holds together the lines 3 and 5. A rib 12 joins the above-mentioned lines 3 and 5 to the central tube 8.

The inner guide walls, formed by the tube 8, as well as those of the wall 9 are designed to be smooth.

The position of an imaginary plane E, represented by a dash-dotted line, is determined by the nozzle mouth 7. The pressure nozzle 1 impacts this imaginary plane at an acute angle, designated α.

The Coanda flow setting in at the smooth surfaces F is imparted a sudden change of direction by means of a disruption edge K and causes an intentional vortex formation in the working region of the arrangement.

For the sake of clearness, welding seams 13 have been indicated at several points of the arrangement.

Figure 2:
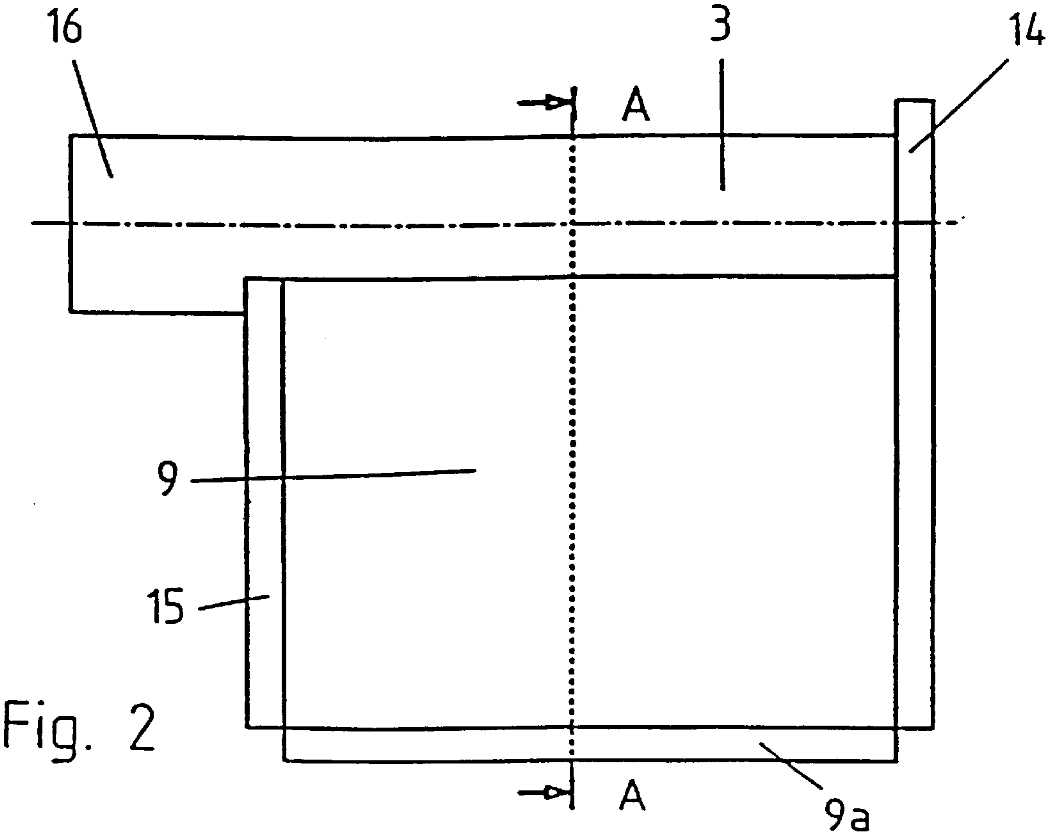
FIG. 2 is a lateral view of the nozzle of FIG. 1.

FIG. 2 shows the already mentioned line 3 for drawn-off media and the left outer guide wall 9 with its outwardly bent edge 9*a*. A flange-like lid 14, comp. FIG. 1, is dismountable, permitting cleaning of the interior. A further lid 15 in the left portion of FIG. 2, is fixedly arranged. The reference numeral 16 designates the connection member for the lines 3 and 5, which, in a per se known manner, serves as coupling with suction and pressure lines that lead to a blower (not shown).

Figure 3:
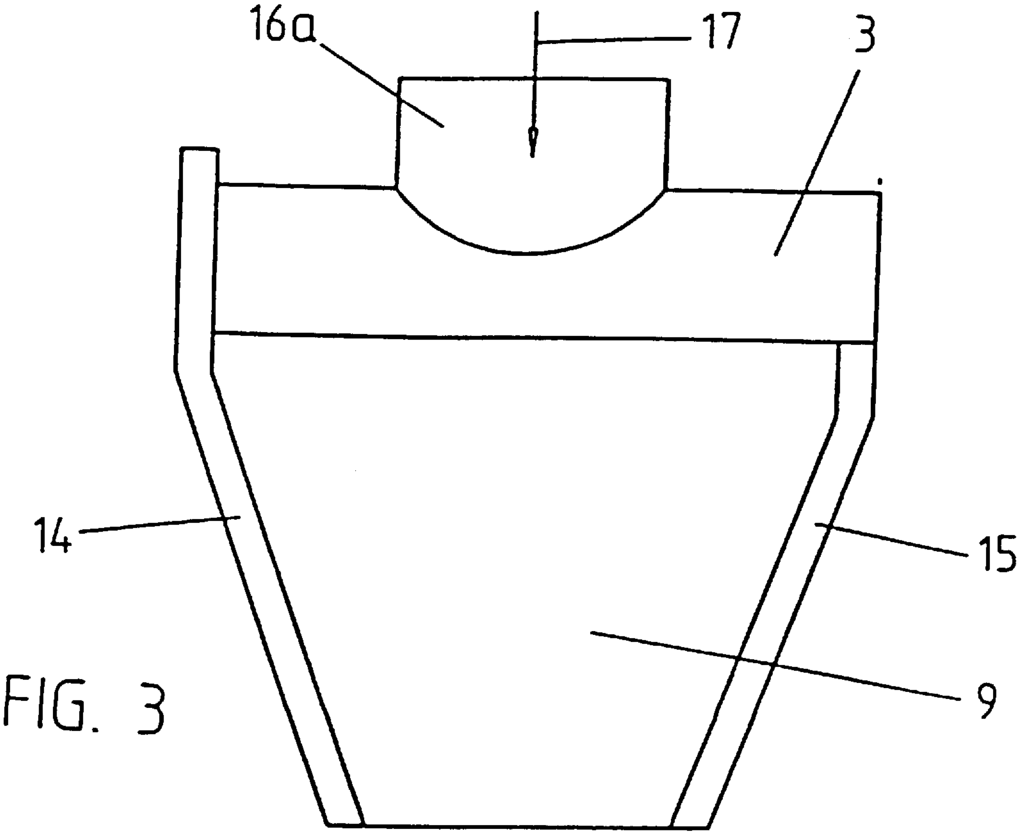
FIG. 3 represents a view of a nozzle arrangement which is supplied with compressed air in its center and which tapers down in the direction towards the nozzle.

FIG. 3 illustrates a variant of FIGS. 1 and 2, in which a pressure line 3 is centrally supplied with compressed air by means of a connector member 16*a*. The outer guide walls 9 taper down towards the nozzle mouth. As in FIG. 2, there are provided the lids 14 and 15.

In an analogous manner, a spherical solution (not shown) can be realized, whereby the inner tube 8, too, must be replaced by a sphere.

Figure 4:
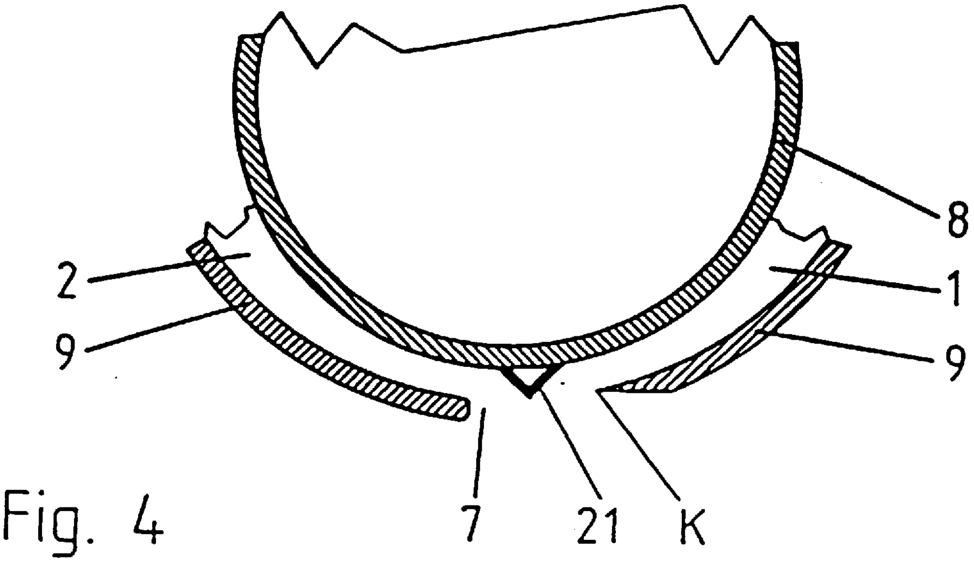
FIG. 4 is a cross-sectional view of a variant of an arrangement with a nose-like disruption element.

FIG. 4 indicates a nose-like angular body 21 which produces an additional constriction between the nozzle mouth 7 and the surface which is to be treated.

Figure 5:
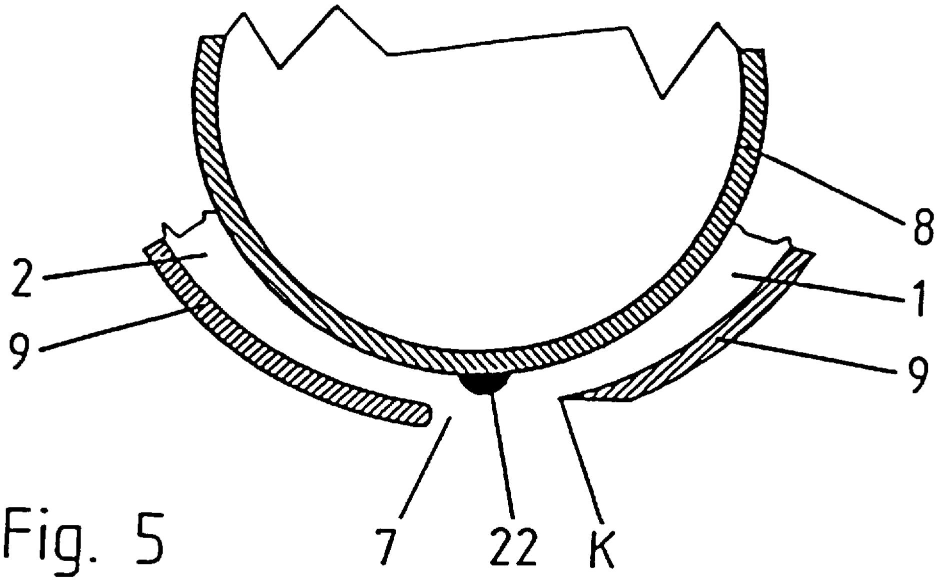
FIG. 5 is a cross-sectional view of another variant with a nose-like disruption element.

FIG. 5 shows a nose-like body 22 which is rounded and rigid or flexible. This body, too, changes the flow conditions in the nozzle mouth, but not to the same degree as the previously mentioned angular body 21.

Both bodies effect a change of direction of the Coanda flow and thus serve the intended non-stationary vortex formation.

Figure 6:
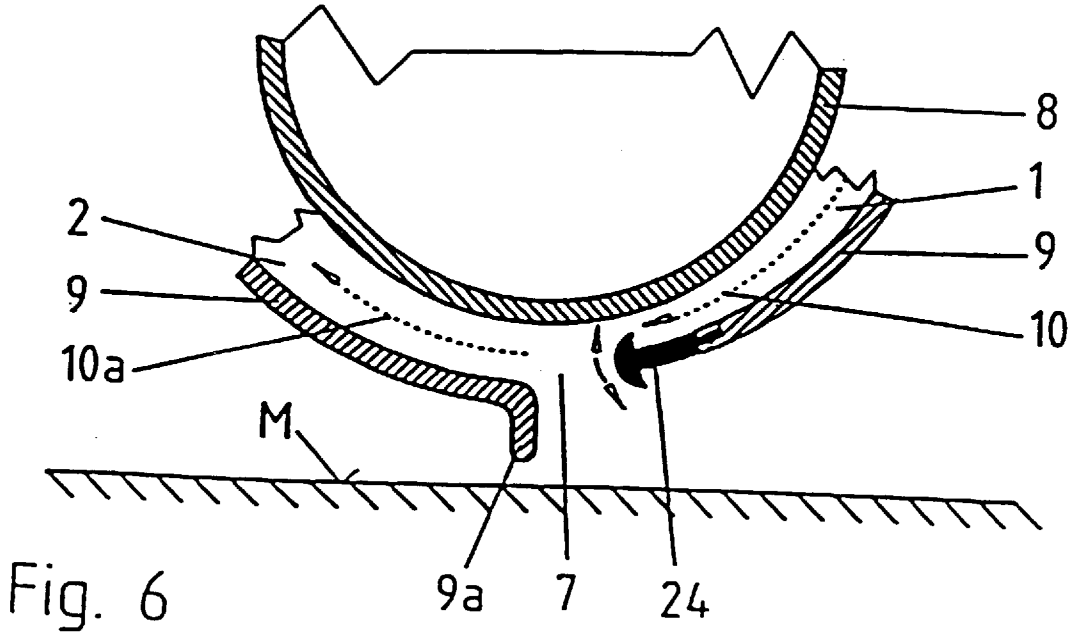
FIG. 6 shows a pulsator elastically or hingedly attached to the leading guide wall.

FIG. 6 shows the surface M to be treated, as well as, amongst others, a pulsator 24 which, elastically or hingedly, is attached to the guide wall 9 and serves for the generation of oscillations in the flow 10, and thus also in the flow 10*a*.

The direction of oscillation of the pulsator 24 is indicated by a double arrow.

Figure 7:
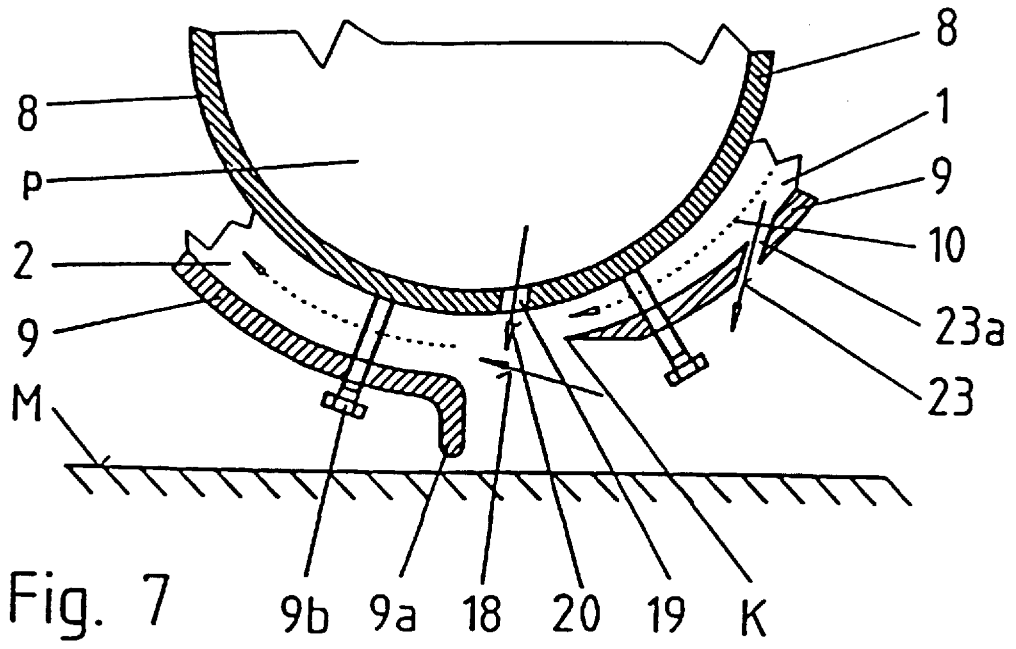
FIG. 7 illustrates an arrangement provided with adjustment means as well as, additionally, with bores and longitudinal slits in the guide walls.

FIG. 7 again shows the surface M to be treated and, moreover, a secondary flow 23 passing through nozzle-like bores or longitudinal slits 23*a* in the outer guide wall 9. This secondary flow, too, impacts the working region of the nozzle arrangement.

An additional overpressure p in the tube 8 produces via a bore 19 or via a slit or several bores 19*a* further flow acting in the working region, symbolized by an arrow 20.

The overpressure p is easily controlled and can be intermittently applied as an additional flow.

Figure 8:
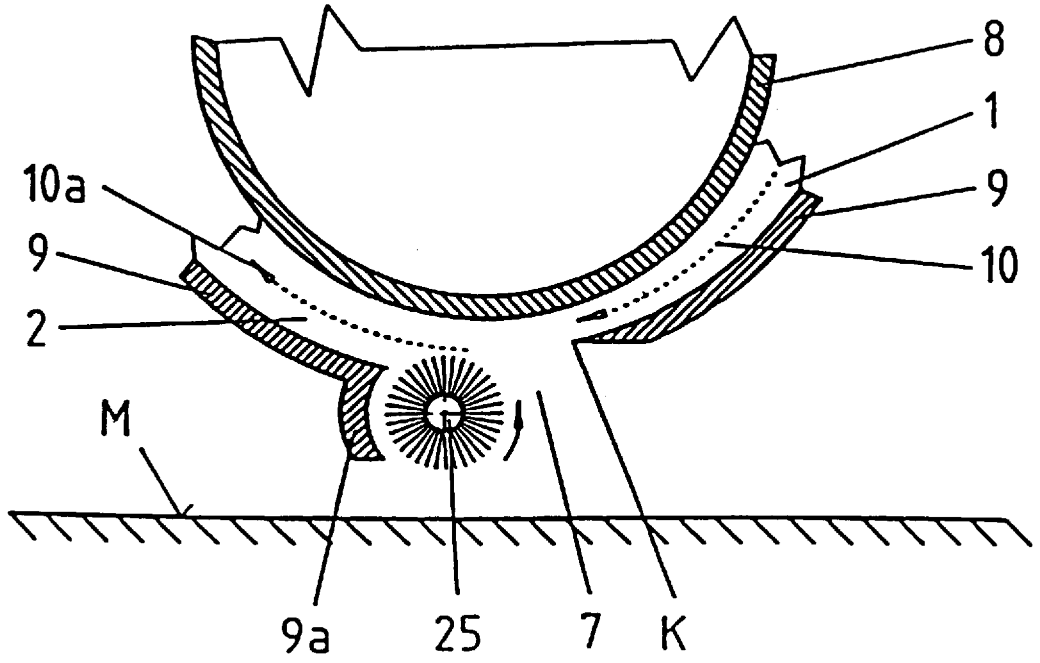
FIG. 8 represents a further variant with a rotating brush for an additional moving of the flow media and the particles.

FIG. 8 shows a rotary brush 25 which, in this case, is driven by the flows 10 and 10*a*. It is obviously also possible to have the brush driven by an electric motor or, for example, by a turbine, also rotating in the direction of the arrow.

This brush helps to move the solid particles into the region of the nozzle mouth, where they are caught by the suction flow 10*a*.

Figure 9:
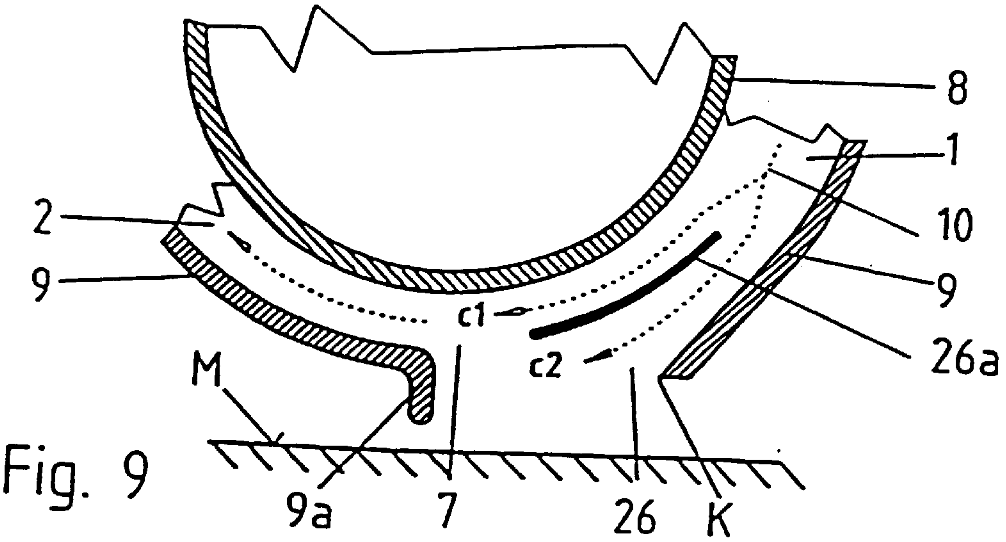
FIG. 9 shows an intermediate wall dividing the pressure nozzle into a narrower nozzle and an outer diffuser.

FIG. 9 illustrates the advantageous division and guiding of the pressure flow by an intermediate wall 26*a* (drawn as a bold line), with the resulting velocities c1 and c2, where cl>c2. In the nozzle mouth, this acts optimally in conjunction with an outwardly bent edge 9*a* in the guide wall and enhances the performance of the arrangement.

Figure 10:
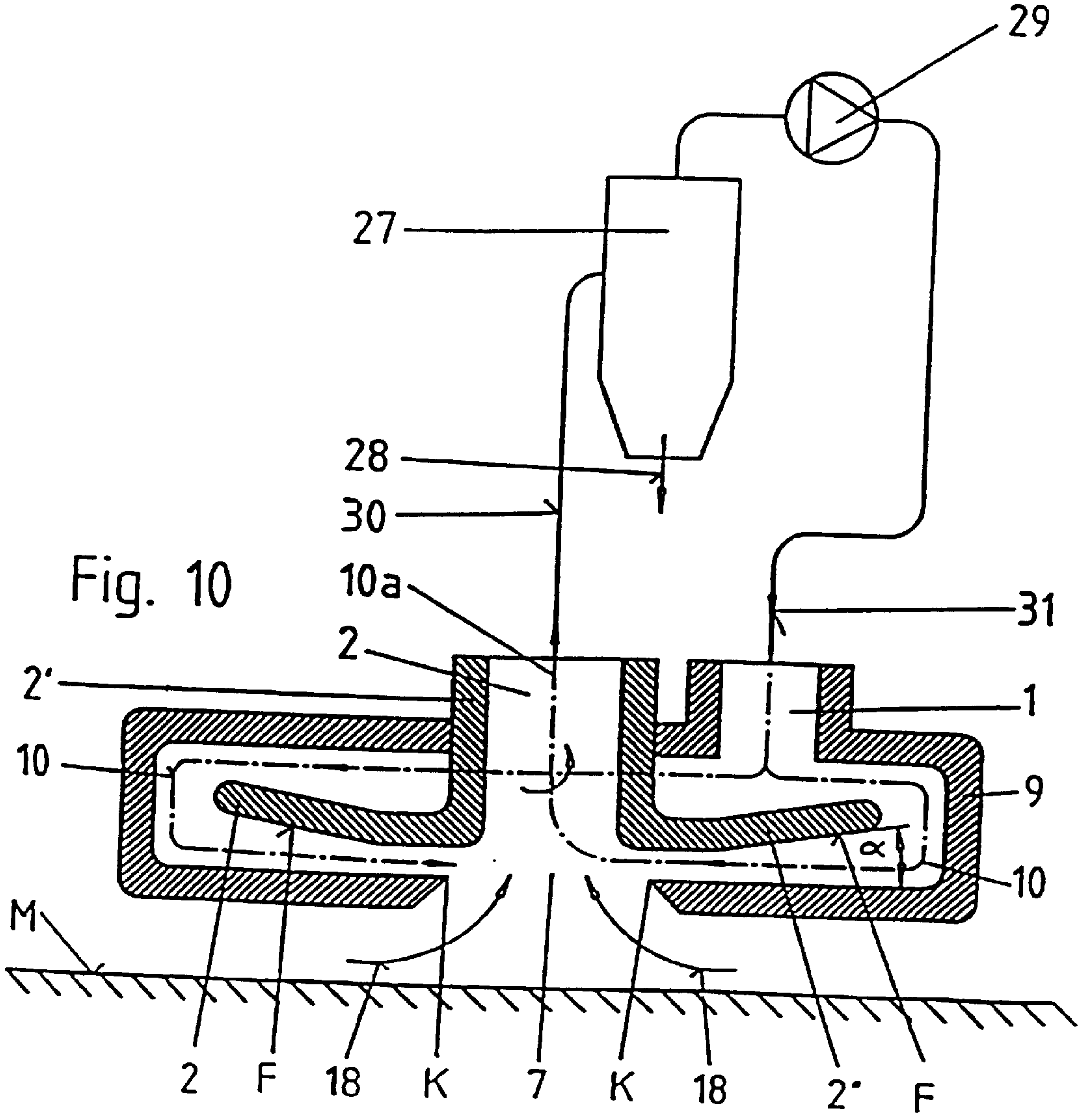
FIG. 10 represents a variant of the object of the invention having two opposite nozzles, with recirculation of the flow via a blower.

FIG. 10 represents another variant of the nozzle arrangement. The pressure-nozzle component 1 leads the compressed air flow into the center of the nozzle mouth 7. Due to this arrangement, the shearing force acts concentrically on the surface M to be treated. The suction-nozzle component draws in from the nozzle mouth 7 the media to be transported, under formation of vortices with parallel axes, as indicated in the drawing. The outer guide walls 9 form a flat box into which enter from above the tubes for the pressure flow 10 and the suction flow 10*a*. The suction-nozzle component 2 consists of a tubular component 2' and a guide flange 2" concentrically emerging from the tubular component 2' and laterally conforming with the box-like shape of the guide walls 9.

Again there sets in at the surfaces F the already described Coanda flow and is detached by the edges K.

The connecting lines 30 for the circulation lead the suction flow 10*a* into the conveyer and/or separator and/or condenser 27, which is provided with a bypass 28. Further connecting lines 31 connect a compressor 29 for the recirculation with the pressure-nozzle component 1.

By means of lateral openings 32 not shown in FIG. 10 (see FIGS. 11 and 12), preferredly by means of wings raised by bending from the guide walls 9, vortex formation in the box can be influenced.

Figure 11:
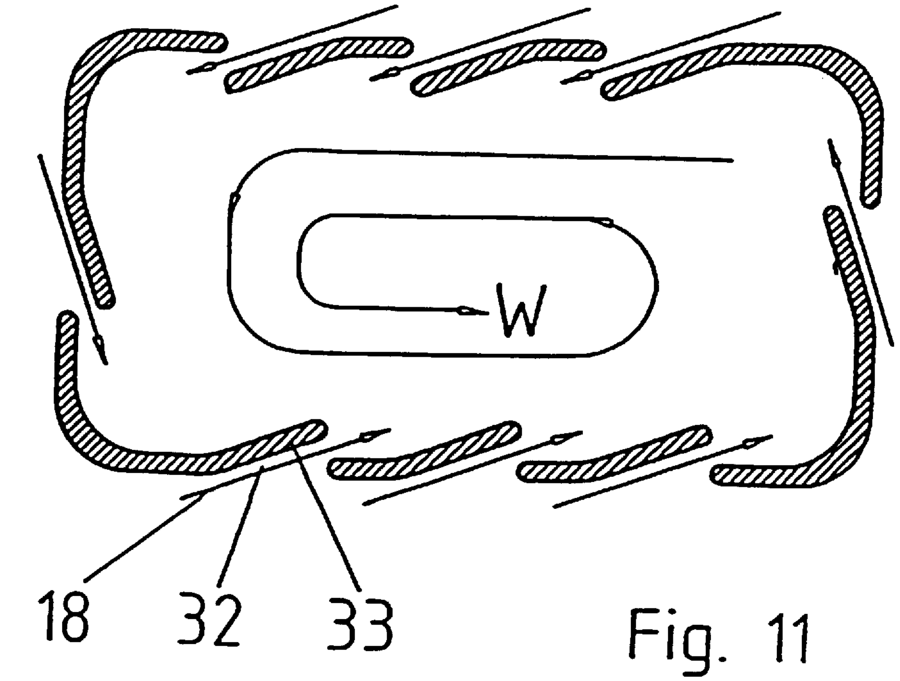
FIG. 11 is a partial view, in a schematic top view, of an arrangement analogous to FIG. 10, with lateral wings to produce a tangential central flow.
Figure 12:
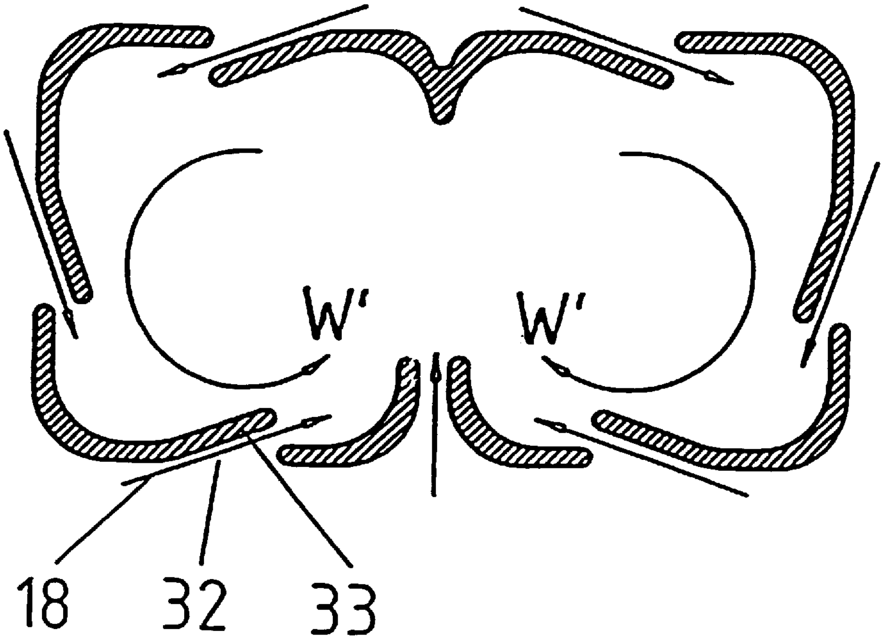
FIG. 12 is a variant of FIG. 11, with two double vortices.

This possibility is outlined in FIGS. 11 and 12, with the wings bent into the box being designated with the numeral 33. The resulting vortex flow is indicated again by arrows 18.

In FIG. 11 the resulting circular vortex flow is marked with W. The double vortices formed in the arrangement of FIG. 12 are each characterized with W'.

It is surprising that the object of the invention, applying the same principle, shows good results at low power, for instance at the cleaning of pedestrian and vehicular areas, at the drying and/or degassing of surfaces, but also at the positive transporting of liquids.

It is self-understood that the type of flow return via the same drive unit is possible, and offers advantages, also with the previously described arrangements.

The structural design is flexible within wide limits and is adaptable to the desired aspects.

Also envisaged are process-engineering cycles in which, for instance, an inert transport medium is used which, with the aid of bypasses, is maintained at, or topped up to, a constant concentration.

I claim:

1. A nozzle apparatus for the positive intake and removal of at least one of solid particles and flow media, comprising a first nozzle connected to a pressure source for generating a pressure flow from said first nozzle; a second nozzle connected to a vacuum source for generating a suction flow into said second nozzle, each of said first and second nozzles having a wall which together form a smooth, generally continuous surface for generating a Coanda effect in the pressure flow, said first and second nozzles being oriented to direct the respective flow along said continuous surface and being spaced by a nozzle mouth, said second nozzle being oriented with respect to said first nozzle such that the pressure flow from said first nozzle enters said second nozzle through the Coanda effect generated by said pressure flow; and means located proximate said nozzle mouth for generating a partial disruption to the Coanda effect at the first nozzle to generate a turbulent flow in said pressure flow in the region of the nozzle mouth to engulf said at least one of said solid particles and flow media exterior to the nozzle mouth and convey said engulfed particles and flow media towards said second nozzle for collection.

2. The nozzle arrangement according to claim 1, wherein said disruption means is in the form of a nose-like body.

3. The nozzle arrangement according to claim 1 further comprising a pulsator located at an end of said first nozzle.

4. The nozzle arrangement according to claim 1 further comprising nozzle width adjusting means associated with at least one of said first and second nozzles for adjusting flow therethrough.

5. The nozzle arrangement according to claim 1, wherein said first and second nozzle walls form a common smooth, guide wall.

6. The nozzle arrangement according claim 5, wherein said guide wall has means for introducing a secondary pressure flow towards said nozzle mouth.

7. The nozzle arrangement according to claim 1 further comprising means located in a working region of the nozzle mouth for imparting motion to said at least one of said solid particles and flow media.

8. The nozzle arrangement according to claim 7, wherein said means for imparting motion comprises a rotating brush.

9. The nozzle arrangement according to claim 1 further comprising an intermediate wall located within said first nozzle having a first surface forming a first nozzle restrictor and a second surface for diffusing a portion of said pressure flow.

10. The nozzle arrangement according to claim 1, wherein said pressure source and said vacuum source each comprise portions of a compressor.

11. The nozzle arrangement according to claim 1, wherein the second nozzle includes at least one lateral opening for admission of a flow thereinto extending in a tangential direction relative to the suction flow.

* * * * *